United States Patent

[11] 3,609,407

[72] Inventor Valdis E. Garuts
 Beaverton, Oreg.
[21] Appl. No. 831,626
[22] Filed June 9, 1969
[45] Patented Sept. 28, 1971
[73] Assignee Tektronix, Inc.
 Beaverton, Oreg.

[54] AUTOMATIC TRIGGER LEVEL CONTROL CIRCUIT
 11 Claims, 7 Drawing Figs.
[52] U.S. Cl.................................................. 307/264,
 307/235, 328/115
[51] Int. Cl..................................................... H03k 5/20,
 H03k 5/00
[50] Field of Search............................................ 307/235,
 264, 268; 328/115–117

[56] References Cited
 UNITED STATES PATENTS
 3,319,170  5/1967  Harmer ....................... 328/117 X Primary Examiner—Donald D. Forrer
Assistant Examiner—John Zazworsky
Attorney—Buckhorn, Blore, Klarquist and Sparkman ABSTRACT: A circuit is disclosed for automatically varying the trigger level of a trigger circuit in order to maintain this level substantially proportional to the amplitude of a series of similar waveforms of an input signal. A peak detector provides a voltage substantially proportional to the peak voltage of the input waveforms. A manually adjustable fraction of the detected voltage is delivered to a control circuit as a control voltage to cause selection of increments of the input waveforms crossing a signal voltage level of these waveforms corresponding to the control voltage. The control circuit supplies control signals corresponding to such increments to a trigger circuit at a signal level which causes the trigger circuit to produce trigger pulses when the varying voltages of the input waveforms cross a signal level within the selected increments. This signal level remains substantially proportional to the peak voltage of the input signal waveforms even though this peak voltage changes.

PATENTED SEP28 1971 3,609,407

VALDIS E. GARUTS
INVENTOR

BY
BUCKHORN, BLORE, KLARQUIST & SPARKMAN
ATTORNEYS

AUTOMATIC TRIGGER LEVEL CONTROL CIRCUIT

BACKGROUND OF INVENTION

Automatic trigger level control circuits have been proposed in which a peak detector provides a voltage which is approximately equal to the peak voltage of a series of similar waveforms of input signal. A selected fraction of this voltage is supplied to one input of a differential amplifier and the input signal is supplied to the other input. The output of the differential amplifier is supplied to a trigger circuit which produces a trigger signal whenever the varying voltage of a waveform crosses the voltage level of the selected fraction of the peak voltage in one direction.

The result is that the triggering level set by the adjustment of the potentiometer is automatically varied approximately proportionally to the peak voltage of the waveforms so that triggering occurs at times which correspond to approximately equivalent portions of the waveforms when the amplitude of the input waveforms is changed.

In the circuit just described, the output of the peak detector is less than the actual peak voltages of the waveforms because of voltage drops in the detector so that triggering at voltage levels near the peak of the waveforms does not occur.

In another proposed automatic trigger control level circuit the selected fraction of the detected peak voltage of the waveforms of the input signal is inverted and amplified and is then fed back to the input of the circuit where it is added algebraically to the input signal. The resulting signal is supplied to a trigger circuit of the type described above to produce a similar result. The voltage drops in the peak detector can be at least partly compensated for but the feedback circuit introduces an additional time delay so that a failure of triggering occurs during rapid changes in the peak voltage of a series of similar input waveforms. The above circuits constitute an improvement over prior circuits which provide for manual adjustment only of the trigger level. The present invention provides a significant improvement in the accuracy of the automatic control of the triggering level.

SUMMARY

The circuit of the present invention provides triggering operations which occur at times which more accurately correspond to the times when the varying voltages of waveforms of a series of similar input waveforms cross a voltage level related to a selected fraction of the peak voltage of these waveforms. Thus the voltage drops which reduce the accuracy of operation in prior circuits can be substantially entirely eliminated and triggering immediately adjacent the peaks of the input waveforms can be obtained. These results can be obtained in a circuit in which rapid changes in amplitude of the series of input waveforms can occur without significant loss of triggering.

It is therefore an object of the present invention to provide an improved automatic trigger control circuit which enables triggering at substantially any portion of the waveforms of an input signal and accurately maintains the triggering level substantially proportional to the peak voltage of the waveforms.

DESCRIPTION OF THE PREFERRED EMBODIMENT

Figure 1:
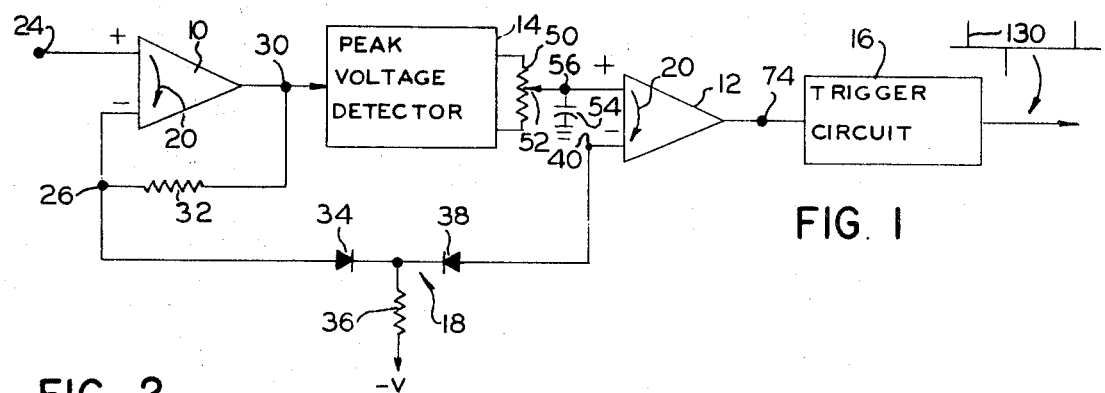
FIG. 1 is a block diagram of the circuit of the present invention showing certain elements schematically.
Figure 2:
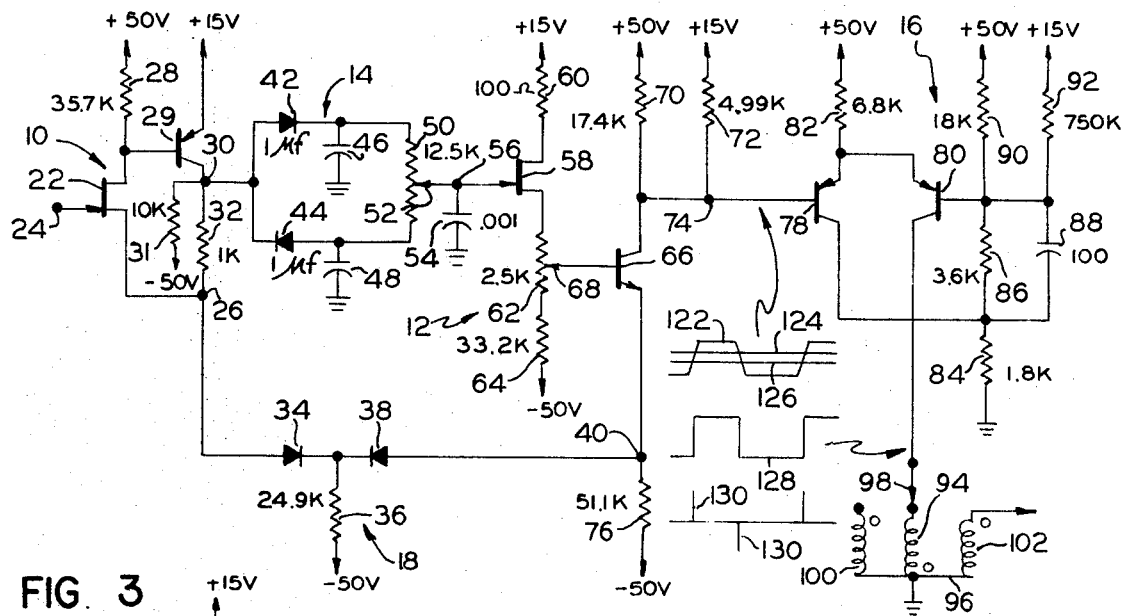
FIG. 2 is a schematic diagram of the circuit of FIG. 1.

The circuit of FIGS. 1 and 2 includes an input differential amplifier 10, an output differential amplifier 12 ad a peak detector 14 connected to receive a signal from the input amplifier 10 and deliver an adjustable voltage to the plus input of the output amplifier 12. The output amplifier 12 is connected to a trigger circuit 16 and forms a part of a control circuit including a nonlinear signal transfer circuit 18 connected between the negative inputs of the differential amplifiers 10 and 12. As described below the amplifiers 10 and 12 are each of the type in which the voltage at the minus input substantially follows the voltage applied to the plus input as is indicated by the arrows 20 in FIG. 1 and these minus inputs are low impedance or current inputs.

As shown in FIG. 2, the input amplifier 10 includes an N channel field effect transistor 22 having its gate connected to the plus input terminal 24 of the amplifier which is also the input terminal of the level control circuit. This transistor has its source connected to the minus input terminal 26 of the amplifier 10. The drain of the transistor is connected through a load resistor 28 to a source of positive potential.

A PNP transistor 29 has its base connected to the drain of the transistor 22 and its emitter connected to a source of positive potential. The collector of the transistor 29 is connected to the output terminal 30 of the amplifier 10 and to a source of negative potential through a resistor 31. The output terminal 30 is connected to the minus terminal 26 of the amplifier 10 through a feedback resistor 32 and is also the input terminal of the detector 14.

The minus terminal 26 of the amplifier 10 is also connected through a diode 34 and a resistor 36 to a source of negative potential, the diode 34 and the resistor 36 being parts of the signal transfer circuit 18. When the input terminal 24 of the amplifier 10 is at ground potential and the values of the components and voltage sources are those of the specific circuit shown in FIG. 2, approximately 1 milliampere flows through this diode 34 and the voltage at the minus terminal 26 of the amplifier 10 is approximately 1 volt. As described below, a diode 38 also forming part of the signal transfer circuit 18 has approximately 1 milliampere flowing through it when no signal is being applied to the input terminal 24. The 1 milliampere flow of current through diode 38 requires that the voltage at the minus input terminal 40 of the output amplifier 12 also be approximately 1 volt.

Assuming that the voltage at the minus input terminal 40 of the output amplifier 12 remains at approximately 1 volt, which is a possible condition also described below, an increasing positive voltage applied to the input terminal 24 will cause the voltages of the minus input terminal 26 and the output terminal 30 of the amplifier 10 to move in a positive direction. The current through diode 34 and to a much lesser extent the current through resistor 36 will increase to cause the voltage at the positive end of resistor 36 to also increase. The current flowing through diode 38 will decrease until this diode cuts off. This action will reverse if the voltage being applied to the input terminal 24 is returned to zero.

Similarly, if a voltage applied to the input terminal 24 is increased in a negative direction, the voltage at the terminals 26 and 30 will move in a negative direction. The current through diode 34 will decrease until this diode will cut off and the current through the diode 38 will increase to approximately 2 milliamperes. In the circuit shown a voltage variation of the terminal 26, between approximately 0 and +2 volts, will cause an approximate current variation of 1 milliampere in each direction through the diode 38 since the resistor 36 effectively provides a constant current source.

For purposes of discussion it can be assumed that the approximate values of voltage and current mentioned above are actual values. With this assumption it is apparent that as long as the potential at the minus input terminal 40 of the output amplifier 20 is maintained at 1 volt positive, a variation of the voltage of the minus input terminal 26 of the input amplifier 10 through a 2 volt range about this 1 volt positive level will cause the current through diode 38 to vary through a 2 milliampere range. Outside of this range, one or the other of the diodes 34 or 38 is cut off so that no current variation through diode 38 occurs.

As a result of the non linear operation of the circuit 18 there is a forward signal transfer or forward current feed from the minus input terminal 26 of the input amplifier 10 to the minus input terminal 40 of the output amplifier 12. This forward signal transfer will occur during a voltage increment of any waveform supplied to the input terminal 24 of the circuit which cause variation of the voltage at minus input terminal 26 of the input amplifier within the voltage range mentioned. Under the conditions just described this increment crosses the zero voltage axis of the input waveform but as described below, other voltage increments of the input waveform can be selected.

There is also a corresponding but reverse 2 milliampere variation of the current through the diode 34 when the voltage at the minus input terminal 26 varies through the range of voltages mentioned. This change in current also has an effect on the gain of the input amplifier 10 between the plus input terminal 24 and the output terminal 30 as will be further discussed below.

A change in the voltage at the minus input terminal 40 1 the output amplifier 14 will change the end voltages of the 2 volt range of voltages at the terminal 26 of the amplifier 10 which will produce the 2 milliampere ranges of current variation through the diodes 34 and 38. For example, if the voltage at the terminal 40 is changed to +2 volts, the change of voltages at the terminal 26 will cause a change of current between zero and 2 milliamperes through the diodes 34 and 38 will be between +1 and +3 volts instead of the zero and +2 volts required when the voltage at terminal 40 was plus 1 volt. The center voltage of the increment of input waveform voltage which is thus selected and results in the 2 milliampere ranges of current through the diodes 34 and 38 will be moved in a positive direction by approximately 1 volt. The change in the midpoint of the increment of voltage of a waveform applied to the input terminal thus results from a reverse feedback through the circuit 18 from the minus input terminal 40 of the output amplifier 12 to the minus input 26 of the input amplifier 10.

The voltage gain of the input amplifier 10 between the plus input terminal 24 and the output terminal 30 of this amplifier is primarily determined by the current flow through and the resultant voltage drop across the resistor 32. In the rest condition of the specific circuit shown when no voltage is being applied to the input terminal 24 of the circuit, the 1 milliampere current through the diode 34 flows through the load resistor 28 and transistor 22 so that the voltage across the resistor 32 is zero and the voltage at the output terminal 30 of the input amplifier 10 is also +1 volt. Any increase or decrease of current through the diode 34 is, however, primarily supplied through the resistor 32. When either of the diodes 34 or 38 are cut off as described above, the variation of current through the resistor 32 due to a variation of the signal voltage to the input terminal 24 is relatively small and the gain thus produced is approximately unity.

Within the selected voltage increments of the input waveforms referred to above when both of the diodes 34 and 38 are conducting, the variations of current through the diode 34 and thus through the resistor 2 are relatively large when the voltage applied to the input terminal 24 is varied. Thus the gain of the amplifier 10 during such increments is relatively large and this gain may be made approximately that necessary to supply nonlinear voltage drops in the circuits such as those across rectifier diodes which follow the amplifier 10 as also discussed below.

The amplified input voltage waveforms appearing at the output terminal 30 of the amplifier 10 are supplied to the peak voltage detector 14 where they are detected by the diodes 42 and 44, and the maximum or most positive voltage of the waveforms stored in the capacitor 46 and the minimum or most negative voltage or the waveforms stored in the capacitor 48. In addition to producing substantially linear voltage drops when they are conducting, the diodes 42 and 44 have a substantially constant voltage drop which is independent of the amount of current. As indicated above, the gain of the amplifier 10 can be used to increase the amplitude of the waveforms of the output of amplifier to substantially compensate for such nonlinear voltage drops.

The actual voltages across the capacitors 42 and 44 are with respect to ground but for the purposes of this application the term peak voltage of a waveform is employed to mean the voltage difference between a reference voltage which is halfway between the maximum and minimum voltages of the waveform and either of these maximum or minimum voltages.

A potentiometer 50 has its resistance element connected across the terminals of the capacitors 46 and 48. A detected voltage equal to the peak voltage of the positive portion of the waveforms supplied to the detector from the amplifier 10 less the voltage drop in the diode 42 appears across the upper half of the resistance element of the potentiometer 50 and a similar detected voltage equal to the negative peak voltage of the negative portions of these waveforms, less the voltage drop of the diode 44 appears across the lower half of the resistance element of the potentiometer 50. Because of the normal or rest condition 1 volt positive voltage at the output of the amplifier 10, the voltage at the contact 52 when in its center position will be approximately +1 volt for zero input signal or for input signals having equal positive and negative peak voltages. The voltage at the contact 52 is stored by the capacitor 54 which limits the rate at which the voltage at the contact can be changed. The time constant of the circuit including the capacitor 54 and the time constant of the detector circuit 14 can, however, be made sufficiently low that any loss of triggering during rapid changes of amplitude of the input waveforms does not persist for a significant time.

The contact 52 is connected to the plus input terminal 56 of the differential amplifier 12. This amplifier has an input field effect transistor 58 having its gate connected to the plus input terminal 56. The drain of this transistor is connected to a positive source of potential through a parasitic oscillation suppression resistor 60 and its source connected to a negative source of potential through the resistance element of a potentiometer 62 in series with a load resistor 64.

The amplifier 14 also contains an NPN transistor 66 having its base connected to the movable contact 68 of the potentiometer 62. The transistor 66 also has its collector connected to a source of positive potential through a resistor 70. It also has its collector connected to a source of lower positive potential through a resistor 72 and to the output terminal 74 of the amplifier 12. The emitter of this transistor is connected to the minus input terminal 40 of the output amplifier 12 and to a source of negative potential through a resistor 76.

With the movable contact 52 of the potentiometer 50 at its normal or +1 volt potential, a proper adjustment of the position of the contact 68 of the potentiometer 62 discussed below will provide the approximate +1 volt potential discussed above at the minus input terminal 40 of the output amplifier 12. Under these conditions, approximately 2 milliamperes flow through the collector-emitter path of the transistor 66, of which 1 milliampere flows through the diode 38 as discussed above and 1 milliampere flows through the resistor 76. This +1 potential is closely maintained so long as the movable contact 52 of the potentiometer 50 remains at a +1 volt potential even though signal voltages causing the current through the diode 38 to vary between 0 and 2 milliamperes are applied to the input terminal 24. This is the result of the source follower and emitter follower operations, respectively, of the transistors 58 and 66 of the output amplifier 12.

When no signal voltage is applied to the input terminal 24 of the circuit potentiometer 50, the entire potentiometer resistance element is maintained at the +1 volt potential and movement of the contact 52 of this potentiometer from the center portion does not affect the condition just described. Any signal voltage made up of repetitive similar waveforms applied to the input terminal 24 of the circuit will, however, produce a voltage between the ends of the resistance element of the potentiometer. The center voltage of this element with respect to ground will be equal to the voltage halfway between the positive and negative peak voltages of the input signal algebraically added to the +1 volt normal or rest potential at the center of this element.

The transistors 58 and 66 cause the voltage at the terminal 40 of the amplifier 12 to follow the voltage of the potentiometer contact 52 whether this contact remains at the center of the resistance element of the potentiometer or is moved toward one or the other end of this resistance element. By a proper choice of the components and supply potentials, for example, those shown in FIG. 2, the gain of the amplifier 10 may be such that the various voltage drops in the circuit so far described can be almost exactly compensated for so that the voltage at the terminal 40 very closely approximates the peak voltage of the positive going portions of the input waveforms plus 1 volt when the contact 52 is at the top end of the resistance element of the potentiometer 50 in FIG. 2.

A similar operation occurs with respect to negative going waveforms when the movable contact 52 is moved to the lower or negative end of the resistance element of the potentiometer 50. Thus a movement of movable contact 52 part way along this resistance element in either direction from the center position will result in the voltage at the terminal 40 being maintained at a voltage which is equal to the normal or rest +1 volt potential of this terminal plus or minus a given fraction of the respective positive or negative peak voltage determined by the setting of the contact 52 even though the amplitude of the waveforms changes.

The increments of the input waveform voltages which cause a change of the current through the diode 38 resulting in a forward feed of a signal between the minus input terminal 26 of the input amplifier 10 and the minus input terminal 40 of the output amplifier 12, have their centers at the voltage maintained at the terminal 40 and are thus selected so that their center voltage is at a level corresponding to a selected fraction of the peak voltage of the input signal waveform applied at the input terminal 24. When the contact 52 is in a center position, the center voltage of these increments is at a voltage level of the input signal halfway between the most positive and most negative voltages of the input signal.

The output terminal 74 of the output amplifier 12 is connected to the base of an input PNP transistor 78 of a Schmitt trigger forming part of the trigger circuit 16. The Schmitt trigger also includes an output transistor 80. The emitters of the transistors are connected together and to a source of positive potential through a common load resistor 82 providing a current source for these emitters. The collector of the transistor 78 is connected to ground through a load resistor 84 and to the base of the transistor 80 through a resistor 86 in parallel with a speed up capacitor 88, the resistors 84 and 86 forming part of a voltage divider between sources of positive potential and ground. This voltage divider also includes the resistors 90 and 92, each having an end connected to one of the sources of positive potential.

The collector of the output transistor 80 is connected to ground through a primary winding 94 of a pulse transformer 96 in series with a switch 98 which can be employed to alternatively connect the collector of the transistor 80 to ground through another similar but reversely wound primary winding 100 of the transformer 96. The transformer also has a secondary winding 102 providing an output of trigger pulses as described below.

OPERATION

The Schmitt trigger including the transistors 78 and 80 has a narrow range of input voltages between its hysteresis limits such that this circuit may be in either of its stable states when the input voltage is within this range. In the particular automatic level control circuit disclosed the center voltage of this range of voltages at the input to the trigger circuit 16 is very close to +15 volts and when no input signal is being applied to the input terminal 24 of this circuit, the movable contact 68 of the centering potentiometer 62 is adjusted to provide an output voltage at the terminal 74 of the amplifier 12 which is the same as this center voltage. This provides the approximate +1 voltage discussed above at the minus input terminal 40 of the amplifier 12 in the circuit shown. No current flows through the resistor 72 when the voltage at terminal 74 is +15 volts and it will be apparent that changes of voltage at this terminal are substantially proportional to the changes of current flow through the resistor 72. This current is very nearly the same as the collector-emitter current of the transistor 66. The voltage at the terminal 74, which is also the input terminal of the trigger circuit 16, is thus very nearly a linear function of the collector-emitter current of the output transistor 66 of the amplifier 12.

As discussed above the current through the diode 38 of the signal transfer circuit 18 varies between 0 and 2 ma., if the input signal applied to the input terminal 24 of the level control circuit has sufficient voltage change to alternately cut off the diodes 34 and 38. As also discussed above, the voltage at the terminal 40 is maintained very close to +1 volt when the contact 52 of the potentiometer 50 remains at a potential of +1 volt. This means that the current through resistor 76 remains at 1 milliampere and that the collector-emitter current of transistor 66 varies between 1 and 3 milliamperes at a rate substantially proportional to the change in current through the signal transfer circuit 18. This is indicated by the curve 104 of FIG. 7 where the vertical axis is input signal voltage at the terminal 24 and the horizontal axis is collector-emitter current of the transistor 66. The range of the collector-emitter current of this transistor which produces the range of voltage at the input terminal 74 of the trigger circuit 16 between the hysteresis limits discussed above is less than and centered between the limits of the 2 milliampere range of collector current shown by the curve 104. The extremities of the range of collector current which produces the range of voltages at terminal 74 between the hysteresis limits referred to is indicated by the lines 106 on FIG. 7. In the specific circuit shown this current range is approximately 0.24 milliampere.

The increment of input signal voltage at the input terminal 24 of the level control circuit which results in the 2 milliampere change in collector current of the transistor 66 is the voltage increment $V_i$ between the lines 107.

Figure 7:
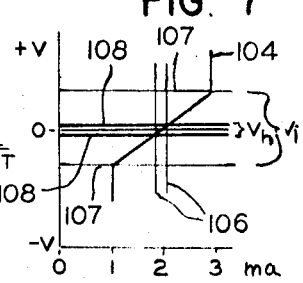
FIG. 7 is a graph showing the relation between the signal current supplied to the trigger circuit from the control circuit and the input voltage and relating the hysteresis limits of the trigger circuit to the input voltage.

Within the signal voltage increment $V_i$, the change of voltage at the input terminal 24 of the trigger level circuit is substantially proportional to the change in voltage at the terminal 74 at the input to the trigger circuit 16. Also the range of signal voltage $V_h$ at the input terminal 24 between the lines 108, which results in the range of collector-emitter current of the transistor 66 between the lines 106 of FIG. 7, is the range of input voltage at this terminal 24 which causes the voltage at the terminal 74 to vary between the hysteresis limits of the trigger circuit 16. This range of voltages at the input terminal 24 shown by the lines 108 will remain centered within the selected input voltage increment $V_i$ shown by the lines 107 and is less than the approximate 2 volt range of this increment, this range of hysteresis voltage referred to the input voltage in the specific circuit shown being about 0.25 volt.

Figure 4:
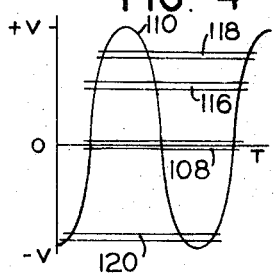
FIG. 4 is a graph showing one of a series of similar input waveforms with selected hysteresis limits of a trigger circuit referred to the input voltage superimposed on such waveform and indicating possible triggering levels.
Figure 5:
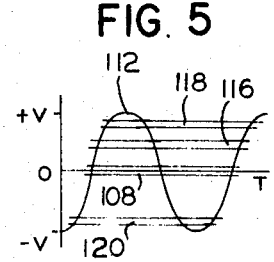
FIG. 5 is a view similar to FIG. 4 indicating the triggering levels when the input waveforms have a lesser amplitude.
Figure 6:
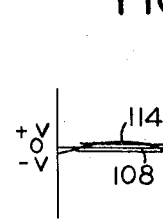
FIG. 6 is a view similar to FIG. 5 showing the conditions when the input waveforms have a still lesser amplitude.

On the graphs of FIGS. 4 to 6, the curves 110, 112 and 114, respectively, represent waveforms which, for example, can be supplied to the input terminal 24 of the trigger level control circuit. These waveforms are similar except that they differ in amplitude in the various figures. For purposes of explanation the waveforms are shown as being symmetrical about a zero voltage axis. Under this condition, the voltage hysteresis limits of the trigger circuit referred to the input voltage at the terminal 24 of the level control circuit can be represented in FIGS. 4 to 6 inclusive by the lines 108 on opposite sides of the zero voltage axis of the input waveforms 110, 112 and 114, when the movable contact 52 of the potentiometer 50 is at its center position. As stated above the selected increments of input voltage which result in operation of the Schmitt trigger of the trigger circuit 16 are always greater than and contain the range of input voltages between the hysteresis limits above discussed as is shown in FIG. 7. The voltage limits of the increments are, however, omitted from FIGS. 4 to 6 inclusive, to avoid a confusing number of lines thereon.

With an input signal voltage symmetrical about a zero voltage axis and having an amplitude such as shown by the waveform 112 of FIG. 5, moving the movable contact 52 of the potentiometer 50 half the distance to the upper or positive end of the resistance element of the potentiometer resistor will result in moving the voltage at the minus input 40 of the amplifier 12 in a positive direction by an amount approximately equal to one-half the peak voltage of the positive going portion of the waveform 112. This is accomplished with very little change of the emitter current of the transistor 66. The result is that the selected increment of input voltage which causes the 2 milliampere current change in the collector current of the transistor 66, and which included the hysteresis limits of the trigger circuit referred to the input voltage, is moved in a positive direction halfway toward the positive peak of the waveform 112. The resulting hysteresis limits referred to the input voltage are represented by the lines 116.

Similarly the selected increment of input signal voltage and included hysteresis limits may be moved to any desired position on the waveform 112, as indicated by the additional pairs of lines 118 and 120, also indicating hysteresis limits, by adjusting the position of the movable contact 52 of the potentiometer 50. Exactly the same type of control occurs, if the amplitude of the input signal is increased as indicated in FIG. 4. Also when the amplitude of the input signal is decreased as shown in FIG. 6 to that which will just cause triggering, all of the selected increments of input voltages move to the zero axis of the input signal so that the hysteresis limits of the trigger circuit referred to the input voltage, occupy the position of the lines 108. While sine wave input signals have been shown in FIGS. 4 to 6, the form of the signal waveforms is not of importance so long as the signal is a series of repeated similar waveforms.

For repeated triggering, the varying input signal voltage at the input terminal 24 causes the voltage at the input terminal 74 of the trigger circuit to repeatedly cross the hysteresis limits of voltage of the trigger circuit 16. For example, the voltage at the input terminal of the Schmitt trigger of this circuit may be similar to the waveform 122 when the movable contact of the potentiometer 52 is adjusted to select a voltage increment providing the hysteresis limits 116 of the input voltage waveform 112 of FIG. 5. The corresponding hysteresis limits of voltage of the Schmitt trigger at the terminal 74 are indicated by the spaced lines 124 and 126.

As the voltage of the waveform 122 repeatedly crosses the upper and lower limits 124 and 126 to cause the transistor 80 to alternate abruptly becomes conducting and cut off, a current waveform of the type indicated at 128 is produced in the transformer winding 94. The abrupt change of current through this winding produces the narrow trigger pulses 130 at the output of the secondary winding 102.

Usually the positive going pulses or alternatively the negative going trigger pulses only are used in circuits to which the trigger pulses are supplied. The switch 98 selects the direction of change of the collector current flow of the transistor 80 which produces trigger pulses 130 of a given polarity and thus determines whether triggering occurs on the positive or negative slope of the input waveform.

In the above description of the operation of the circuit of FIG. 2, it has been assumed that the input waveform applied to the input terminal 24 of the level control circuit is substantially symmetrical about a zero voltage axis. This is not a requirement of the circuit as the positive and negative portions of the input waveforms may be of different shape and amplitude and there may be a steady or slowly varying offset voltage also applied to the terminal 24. The circuit will continue to cause triggering at a voltage level halfway between the maximum and minimum voltages of the waveforms when the movable contact 52 of the potentiometer is at its center position on the resistance element of the potentiometer 50. Upon movement of the movable contact to provide any set fraction of the peak voltage as above defined of either the positive or negative portions of the waveform, triggering will be produced at a voltage level corresponding to this fraction as long as the input voltage capabilities of the circuit are not exceeded. In the specific circuit illustrated these limits are approximately −12 to +12 volts, although higher voltages up to about −15 to +15 volts can be tolerated without overloading any portion of the circuit.

CIRCUIT OF FIG. 3

Figure 3:
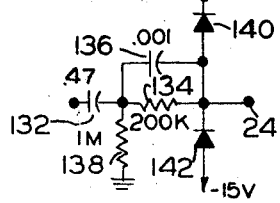
FIG. 3 is a fragmentary schematic diagram of a capacitive coupled or alternating current input circuit for the circuit of FIGS. 1 and 2.

If it is desired to eliminate any steady or slowly varying input voltage, the input circuit shown in FIG. 3 can be employed. This circuit includes an input series capacitor 132 and series resistor 134 bypassed by a capacitor 136. A resistor 138 of relatively high resistance maintain the input voltage at the terminal 24 at an average potential of zero volts. The circuit also includes clamping diodes 140 and 142 connected to 15 volts positive and negative sources of potential, respectively, to prevent the input voltage exceeding 15 volts with respect to ground in either a positive or negative direction. It will be apparent that diodes connected in a similar manner can be employed with the direct coupled input to the circuit of FIG. 2.

I claim:

1. An automatic trigger level control circuit which comprises:

means including an input amplifier means and detector means connected to the output of said input amplifier means for obtaining from an input signal having a series of similar waveforms a detected voltage which is substantially proportional to the peak voltage of said waveforms;

output circuit means including means for obtaining from said detected voltage a control voltage proportional to a selected fraction of said detected voltage;

control means including a nonlinear signal transfer means providing a feedback circuit between said output circuit means and said input amplifier means and responsive to said control voltage for selecting increments of said waveforms extending across an input signal level corresponding to said selected fraction and delivering said increments to said output circuit means;

said output circuit means also including output amplifier means for amplifying said increments and trigger means responsive to the amplified increments for producing trigger signals when said amplified increments cross said signal level corresponding to said selected fraction of said detected voltage.

2. The circuit in accordance with claim 1 in which;

said output circuit means includes manually adjustable means for varying said selected fraction of said detected voltage.

3. The circuit of claim 1 in which:

said input amplifier means includes means for increasing the amplification of said input amplifier means during the time each of said increments is being delivered to said output circuit means so as to compensate for voltage drops in said detector means.

4. The circuit in accordance with claim 3 in which;

the input amplifier means includes a differential amplifier having a plus input connected to receive said waveforms of said input signal, and a minus low impedance input providing a voltage which follows a voltage applied to said plus input and an output connected to said detector means;

the output amplifier means also includes a differential amplifier having a plus input connected to the output of said detector means, a minus low impedance input providing a voltage which follows the voltage applied to the plus input of said output amplifier and an output connected to said trigger means;

and said nonlinear signal transfer means is connected between the minus inputs of said differential amplifiers.

5. The circuit in accordance with claim 4 in which;

said nonlinear signal transfer means includes means responsive to changes in the voltage between the connections of said nonlinear signal transfer means to said differential amplifiers for producing substantially proportional changes in the current through said connections during said increments only.

6. The circuit in accordance with claim 5 in which;

said output amplifier means has means for causing its output current to vary substantially proportionally to the changes in current through said connections.

7. The circuit in accordance with claim 9 in which:

said means for increasing the amplification of said input amplifier means is a feedback circuit from the output to the minus input of the differential amplifier of said input amplifier which feedback circuit also supplies current to said nonlinear signal transfer means during delivery of said increments to said output circuit means.

8. The circuit in accordance with claim 4 in which:

the nonlinear signal transfer means includes a pair of unidirectional conductive means connected in series between said minus inputs of said differential amplifiers for current flow in opposite directions and a constant current source connected to a point between said unidirectional conductive means so that current flow through said unidirectional conductive means varies in opposite directions to substantially the same extent as the voltage at the minus input of one of said differential amplifiers varies with respect to the voltage at the minus input of the other of said differential amplifiers.

9. The circuit in accordance with claim 8 in which;

said means for obtaining a selected fraction of said detected voltage includes manually adjustable means for varying the fraction of said detected voltage applied to the plus input of said differential amplifier of said output amplifier means to thereby control the voltage at the minus input of said differential amplifier of said output amplifier means.

10. The circuit in accordance with claim 11 in which;

said differential amplifier of said output amplifier means includes an output transistor having its emitter connected to said minus input of said differential amplifier of said output amplifier means and its collector connected to the input of said trigger means;

and circuit means connected to said transistor for converting a change of emitter current of said transistor due to a change of current through said unidirectional conductive means of said nonlinear signal transfer means to a voltage change at the input of said trigger means causing the production of said trigger signals during said increments only.

11. The circuit in accordance with claim 10 in which said trigger means produces said trigger signals in response to a range of voltage which corresponds to ranges of voltages of the input signal of the trigger level control circuit and which are less than and contained in the voltage ranges of said increments.

PO-1050
(5/69)

UNITED STATES PATENT OFFICE
CERTIFICATE OF CORRECTION

Patent No. 3,609,407          Dated September 28, 1971

Inventor(s)    VALDIS E. GARUTS

It is certified that error appears in the above-identified patent and that said Letters Patent are hereby corrected as shown below:

Column 3, line 32, after "40" cancel --1--. Column 3, line 71, "2" should read --32--. Column 9, line 20, "9" should read --6--. Column 10, line 13, "11" should read --8--.

Signed and sealed this 7th day of March 1972.

(SEAL)
Attest:

EDWARD M. FLETCHER, JR.          ROBERT GOTTSCHALK
Attesting Officer                 Commissioner of Patents